(No Model.)

S. WATTS.
BICYCLE.

No. 441,728. Patented Dec. 2, 1890.

Witnesses

Inventor
Samuel Watts
By Geo. D. Seymour
Atty.

UNITED STATES PATENT OFFICE.

SAMUEL WATTS, OF BATH, ENGLAND, ASSIGNOR TO ALBERT H. OVERMAN, OF BOSTON, MASSACHUSETTS.

BICYCLE.

SPECIFICATION forming part of Letters Patent No. 441,728, dated December 2, 1890.

Application filed June 16, 1887. Serial No. 241,467. (No model.) Patented in England January 17, 1887, No. 710, and May 21, 1887, No. 7,410.

*To all whom it may concern:*

Be it known that I, SAMUEL WATTS, of Bath, in the county of Somerset, England, have invented a certain new and useful Improvement in Bicycles, (having in connection with Richard John Powell taken out British patents January 17, No. 710, and May 21, No. 7,410, of 1887, on the same invention made by myself,) of which the following is a full, clear, and complete specification:

My invention relates to an improvement in certain parts of a bicycle whereby the machine is rendered simpler and cheaper to construct and more durable and efficient in use.

My invention relates, first, to an improved method of constructing those parts of a bicycle known as the "head" and "neck," which form the joint by which the requisite movement for steering the machine is obtained, and, secondly, to an improved method of applying ball-bearings to the head.

The other parts of the bicycle present no novel features and may therefore be constructed in any convenient and desirable manner.

Figure 1:
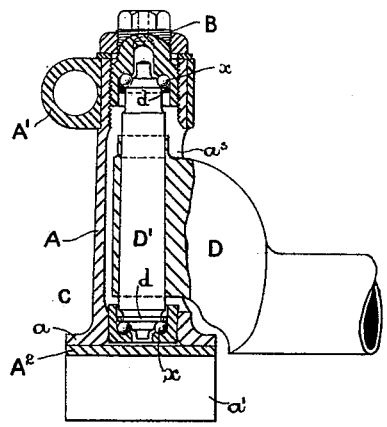
Figure 2:
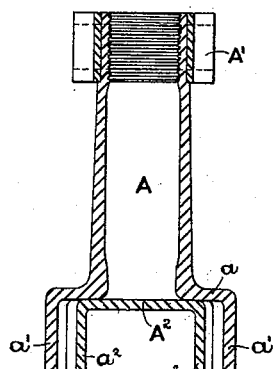
Figure 3:
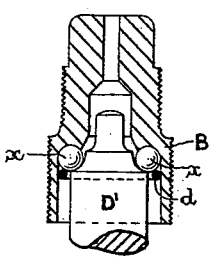
Figure 4:
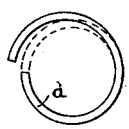

In the accompanying drawings, Figure 1 is a sectional elevation of the head and neck complete. Fig. 2 is a sectional elevation of the head alone, taken at right angles to the sectional elevation shown by Fig. 1. Fig. 3 is a section, on an enlarged scale, of the top center screw of the head, showing the application of anti-friction balls thereto and the method of "caging" them; and Fig. 4 is a view of the elastic split ring used to "cage" the balls.

Throughout the several views similar parts are denoted by like letters of reference.

Instead of making the head out of a forging or stamping, as is usually done, I construct it out of a piece of steel tube of the necessary diameter and thickness.

The piece of tube A is contracted at one end to receive the center screw B and the lug or bracket A' to carry the handle-bar. This lug or bracket may be fixed to the end of the tube by brazing or sweating, or it may be made detachable by a collar and lock-nut, or by a key and collar, or by any other suitable device. At the other end the tube is first jumped to thicken it to allow it to be bored out to receive the lower center cup C, and is then expanded to form the shoulder $a$. It is then split to form the offsetting flanges $a'$ $a'$, forming the outer parts of the lugs or stumps to which the prongs of the forks are fixed. I next take a plate of steel or other metal $A^2$ and bend and shape it to fit under the shoulder $a$ to stiffen the head, and form the depending arms $a^2$ $a^2$, forming the inner parts of the lugs or stumps to which the prongs of the forks are fixed. The superfluous metal is then cut away, and a slot $a^3$ is cut in the back of the head to receive the neck. By this means a head may be made of any desired length or size without the use of expensive dies as used in the present mode of stamping.

Instead of making the neck and neck-spindle in one piece, as is the present practice, I make them in two pieces, thus permitting the centers of the neck-spindle to be made of hardened steel, while the neck may be made of tough iron or soft steel. I use a neck D of the usual shape, and I bore a vertical hole through the front of it and ream it out slightly tapering toward the top. In this hole I drive a taper pin D', which forms the neck-spindle. By constructing the neck and neck-spindle in this manner it allows the neck-spindle to be readily removed and replaced in case of damage through wear or friction without unfixing the neck from the backbone. It also permits of the better and easier fitting and hardening of the bearing-surfaces, and obviously the employment of more suitable material for the separate parts.

In applying anti-friction balls to the centers of the head I form a circular recess in both the top center set-screw B and in the bottom center cup C, each to receive a series of small hardened balls or spheres $x$ $x$, &c.; and I shape the ends of the neck-spindle D' to fit against the rings of balls or spheres, so as to form free bearings between the respective parts. To cage the balls in the respective recesses of the top center set-screw and lower center cup, I use an elastic split ring $d$, as illustrated by Fig. 4. Each ring is forced into the recess after the balls are in place until it is in contact with the balls, and it thus confines them in the circular recess. These spring-rings do not in any way confine or retard the free rotation of the balls, but merely confine them in position, and they are easily removable when it is desired to remove or replace the balls.

I am aware that the heads of bicycles have already been made out of steel tube by constructing the head and fork out of one piece of tube split up through a portion of its length to form the prongs of the fork. I am also aware that it is not new and novel to use balls or spheres between the centers of the heads of bicycles to decrease friction, and also that the balls in such heads have been caged or secured to prevent their falling out or becoming loose when the neck-spindle is removed from the head and in races formed by grooves located in vertical faces of the bearings, and therefore I do not claim these devices, broadly; but, Having now particularly described and ascertained the nature of my said invention, what I do claim, and desire to secure by Letters Patent, is—

1. In a velocipede-head, a shell made from a piece of tubing adapted to receive the top and bottom centers and split and expanded below the bottom center which it surrounds, for its attachment to the fork-arms, substantially as set forth.

2. In a velocipede-head, a shell made from a piece of tubing adapted to receive the top and bottom centers and split and expanded below its bottom center, which it surrounds, for attachment to the fork-arms, and a stay or re-enforce located within the split lower end of the shell and above the fork-arms, substantially as set forth.

3. In a velocipede-head, a shell made from a piece of tubing expanded and shouldered at its lower end to adapt it to be secured to the fork-arms, substantially as set forth.

4. In a velocipede-head, a shell made from a piece of tubing adapted to receive the upper and lower spindle-centers, and split, shouldered, and expanded at its lower end to form two offsetting flanges, to which the respective fork-arms are attached, substantially as set forth.

5. In a velocipede-head, a shell made from a piece of tubing and contracted at its upper end to adapt it to receive the upper spindle-center and split and expanded at its lower end to form offsetting flanges, substantially as set forth.

6. In a velocipede-head, a shell made from a piece of tubing thickened at its lower end in its adaptation to receive the lower spindle-center, substantially as set forth.

7. In a velocipede-head, a shell made from a piece of tubing contracted at its upper and lower ends to receive the spindle-centers and split and expanded below the lower center to form offsetting flanges, substantially as set forth.

8. In a velocipede-head, a shell made from a piece of tubing adapted to receive the upper and lower spindle-centers and split and expanded at its lower end to form two offsetting flanges, and a re-enforce or stay extending across the lower end of the tube, located between such flanges, and having two depending arms, which are attached to the respective fork-arms, substantially as set forth.

9. In a velocipede-head, a shell made from a piece of tubing split and expanded at its lower end to form offsetting flanges for its attachment to the fork-arms, an upper center located in the upper end of the shell, a lower center located above the split in the shell, a spindle working in such centers, a ring or collar embracing the upper end of the spindle and provided with a lug, and a re-enforce or stay located in the lower end of the shell and between its offsetting flanges, substantially as set forth.

10. In a velocipede, a neck having a vertical tapering bore smaller at its upper than at its lower end, and a tapering spindle smaller at its upper than at its lower end and driven into the bore of the neck from the lower end thereof to form a friction connection therewith, substantially as set forth.

In witness whereof I have hereunto signed my name in the presence of two subscribing witnesses.

SAMUEL WATTS.

Witnesses:
CHAS. E. LITTLE,
  *Bath, Solr. and Noty. Public.*
H. PEERS LYLE,
  1 *Queen Square, Bath, his Articled Clerk.*